(12) United States Patent
Basu et al.

(10) Patent No.: US 12,532,036 B2
(45) Date of Patent: Jan. 20, 2026

(54) MULTI-CAMERA MULTIVIEW IMAGING WITH FAST AND ACCURATE SYNCHRONIZATION

(71) Applicant: Adeia Guides Inc., San Jose, CA (US)

(72) Inventors: Anup Basu, Alberta (CA); Dhananjay Lal, Englewood, CO (US); Reda Harb, Issaquah, WA (US)

(73) Assignee: Adeia Guides Inc., San Jose, CA (US)

(*) Notice: Subject to any disclaimer, the term of this patent is extended or adjusted under 35 U.S.C. 154(b) by 2 days.

(21) Appl. No.: 18/087,537

(22) Filed: Dec. 22, 2022

(65) Prior Publication Data

US 2024/0214614 A1    Jun. 27, 2024

(51) Int. Cl.
*H04N 21/2187* (2011.01)
*H04N 21/218* (2011.01)
*H04N 21/2743* (2011.01)

(52) U.S. Cl.
CPC ... *H04N 21/2187* (2013.01); *H04N 21/21805* (2013.01); *H04N 21/2743* (2013.01)

(58) Field of Classification Search
CPC ......... H04N 21/21805; H04N 5/23238; H04N 21/2187; H04N 21/23439; H04N 21/2365; H04N 21/2543; H04N 21/41407
USPC .......................................................... 725/59
See application file for complete search history.

(56) References Cited

U.S. PATENT DOCUMENTS

| | | | |
|---|---|---|---|
| 9,911,198 B2 | 3/2018 | Pham | |
| 11,044,398 B2 | 6/2021 | Molina et al. | |
| 11,323,605 B2 | 5/2022 | Fan et al. | |
| 2012/0320013 A1* | 12/2012 | Perez | H04N 9/8205 345/207 |
| 2013/0093897 A1* | 4/2013 | Fan | H04N 23/80 348/E7.085 |
| 2014/0150032 A1* | 5/2014 | Pacor | H04N 21/41407 725/62 |
| 2015/0380052 A1 | 12/2015 | Hamer | |

(Continued)

FOREIGN PATENT DOCUMENTS

| | | | | |
|---|---|---|---|---|
| AU | 2015243016 B2 | 3/2017 | | |
| EP | 3326365 B1 | 3/2021 | | |
| WO | WO-2017142840 A1 * | 8/2017 | ............ | G06F 16/48 |

OTHER PUBLICATIONS

Ruchay, A. N., et al., "3D object reconstruction using multiple Kinect sensors and initial estimation of sensor parameters," SPIE Optical Engineering and Applications, 341(012147):1-9 (2019).

(Continued)

*Primary Examiner* — Alfonso Castro
(74) *Attorney, Agent, or Firm* — Haley Guiliano LLP

(57) ABSTRACT

There is provided a method comprising: receiving a communication from one or more devices capable of recording content, determining, using a wireless communication transceiver, a geographical location of the one or more devices, determining an orientation of the one or more devices, receiving content capturing an event and recorded on the one or more devices, storing the content capturing an event and recorded on the one or more devices, and creating, from a collection of recordings comprising at least the stored content capturing an event and recorded on the one or more devices, a single representation of the event by combining segments of the collection of recordings.

18 Claims, 12 Drawing Sheets

(56) References Cited

U.S. PATENT DOCUMENTS

| | | | |
|---|---|---|---|
| 2016/0191995 A1* | 6/2016 | el Kaliouby | H04N 21/812 725/12 |
| 2018/0330112 A1 | 11/2018 | Racz et al. | |
| 2020/0162796 A1* | 5/2020 | Azuolas | H04N 21/23106 |
| 2021/0201431 A1 | 7/2021 | Glaser | |
| 2022/0030214 A1 | 1/2022 | Sinharoy et al. | |
| 2023/0057768 A1 | 2/2023 | Ko et al. | |
| 2023/0171568 A1 | 6/2023 | Messia et al. | |

OTHER PUBLICATIONS

"Favendo—Angle of Arrival—High-precision positioning with the AoA method", https://www.favendo.com/angle-of-arrival, retrieved on Mar. 14, 2023, 7 pages.

"Intel® True View—Intel in Sports", https://www.intel.com/content/www/us/en/sports/technology/true-view.html, retrieved on Mar. 13, 2023, 5 pages.

"MathWorks—Transform spherical coordinates to Cartesian", https://www.mathworks.com/help/matlab/ref/sph2cart.html, retrieved on Mar. 14, 2023, 4 pages.

"Multicasting", retrieved at https://multicasting.io/ on Mar. 29, 2023, 10 pages.

Basu, A., "Active Calibration of Cameras: Theory and Implementation", IEEE Transactions on Systems, Man, and Cybernetics, 25(2):256-265 (1995).

Li, X., et al., "NLOS identification and mitigation based on channel state information for indoor WiFi localisation", IET Communications, 11(4): 531-537 (2017).

Casanovas, A.L., et al., "Audio-Visual Events for Multi-Camera Synchronization", Multimedia Tools and Applications, 1-22 (2014).

Crippen, G.M., et al., "Stable calculation of coordinates from distance information", Acta Cryst, 282-284 (1978).

Elhayek, A., et al., "Feature-Based Multi-Video Synchronization with Subframe Accuracy", Joint DAGM (German Association for Pattern Recognition) and OAGM Symposium, 1-10 (2012).

Faraji, M. and Base, A., "Simplified Active Calibration," Image and Vision Computing, 91:103799, 1-14 (2019).

Hartmann, W., et al., "Towards Complete, Geo-Referenced 3D Models From Crowd-Sourced Amateur Images", ISPRS Annals of the Photogrammetry, Remote Sensing and Spatial Information Sciences, III-3:12-19 (2016).

Kouhini, S., et al., "LiFi Positioning for Industry 4.0", IEEE Journal of Selected Topics in Quantum Electronics, 27(6): 1-15 (2021).

Latimer, R., et al., "SocialSync: Sub-Frame Synchronization in a Smartphone Camera Network", ECCV Workshops, 561-575 (2014).

Tang, S., et al., "Learning Camera Localization via Dense Scene Matching", CVPR, 1831-1841 (2021).

Vasisht, D., et al., "Sub-nanosecond time of flight on commercial Wi-Fi cards", Sigcomm, 121-122 (2015).

Zhao, C., et al., "Universal Background Subtraction Based on Arithmetic Distribution Neural Network", IEEE Transactions on Image Processing, 1-16 (2022).

Swami, K.T., et al., "A review of LiFi technology," IEEE International Conference on Recent Advances and Innovations in Engineering, 1-5 (2020).

Kawauchi, K., et al., "Directional beaconing: A robust wifi positioning method using angle-of-emission information," Location and Context Awareness: 4th International Symposium, 4:103-119 (2009).

Pundik, D., et al., "Video Synchronization Using Temporal Signals from Epipolar Lines," ECCV, 15-28 (2010).

U.S. Appl. No. 18/087,533, filed Dec. 22, 2022, Anup Basu.

* cited by examiner

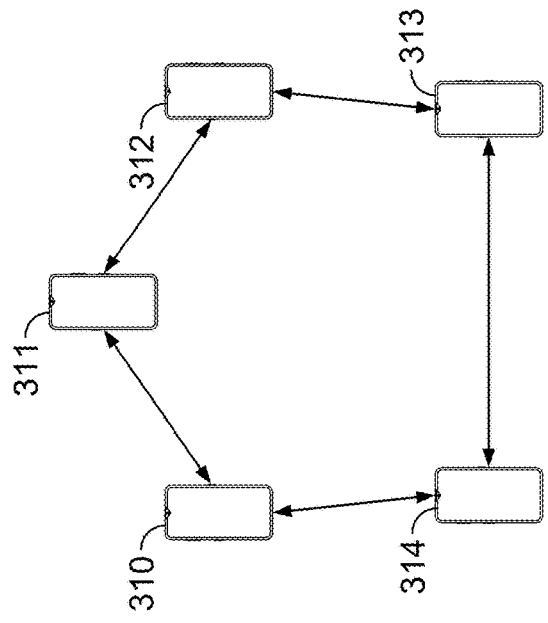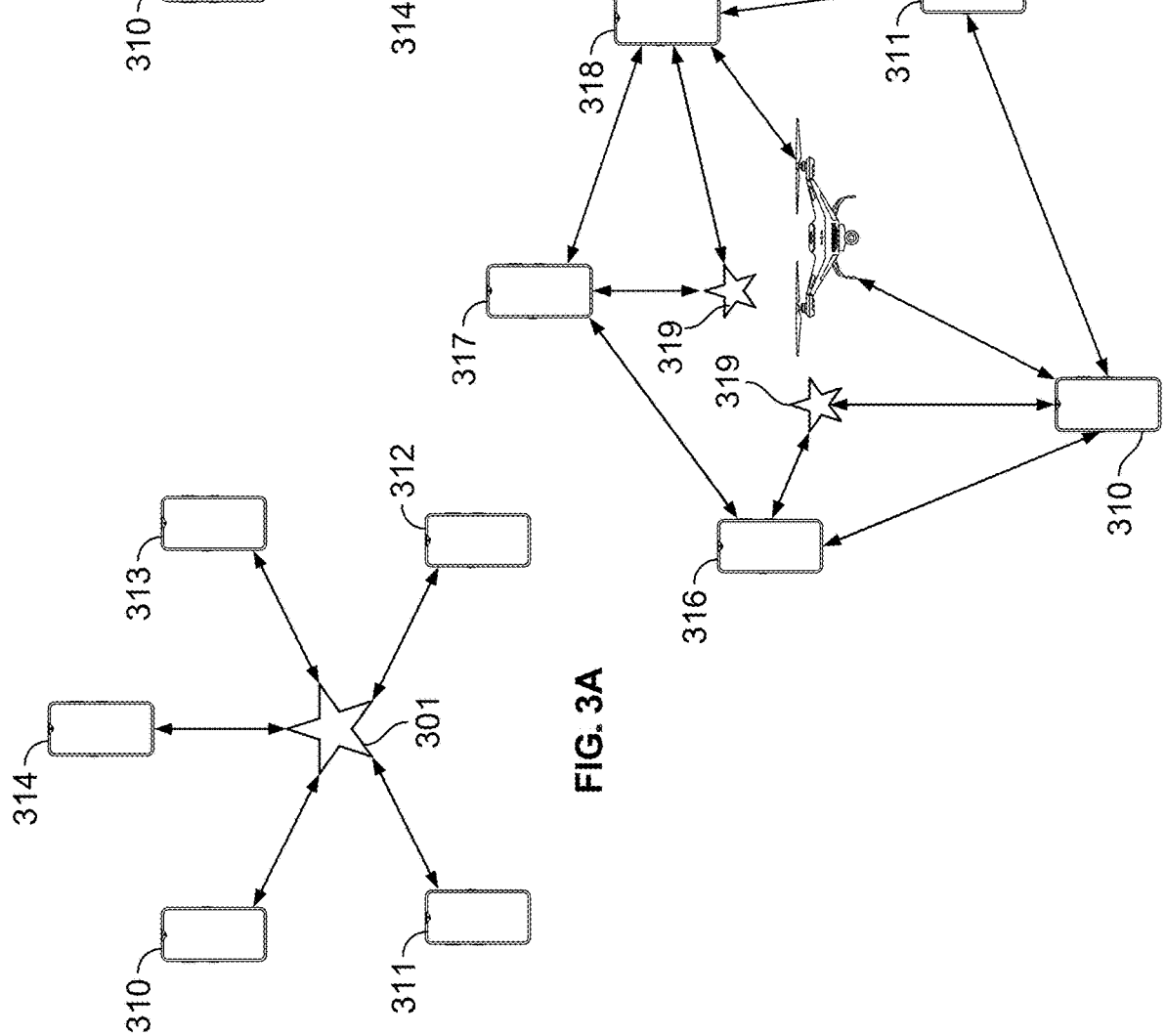

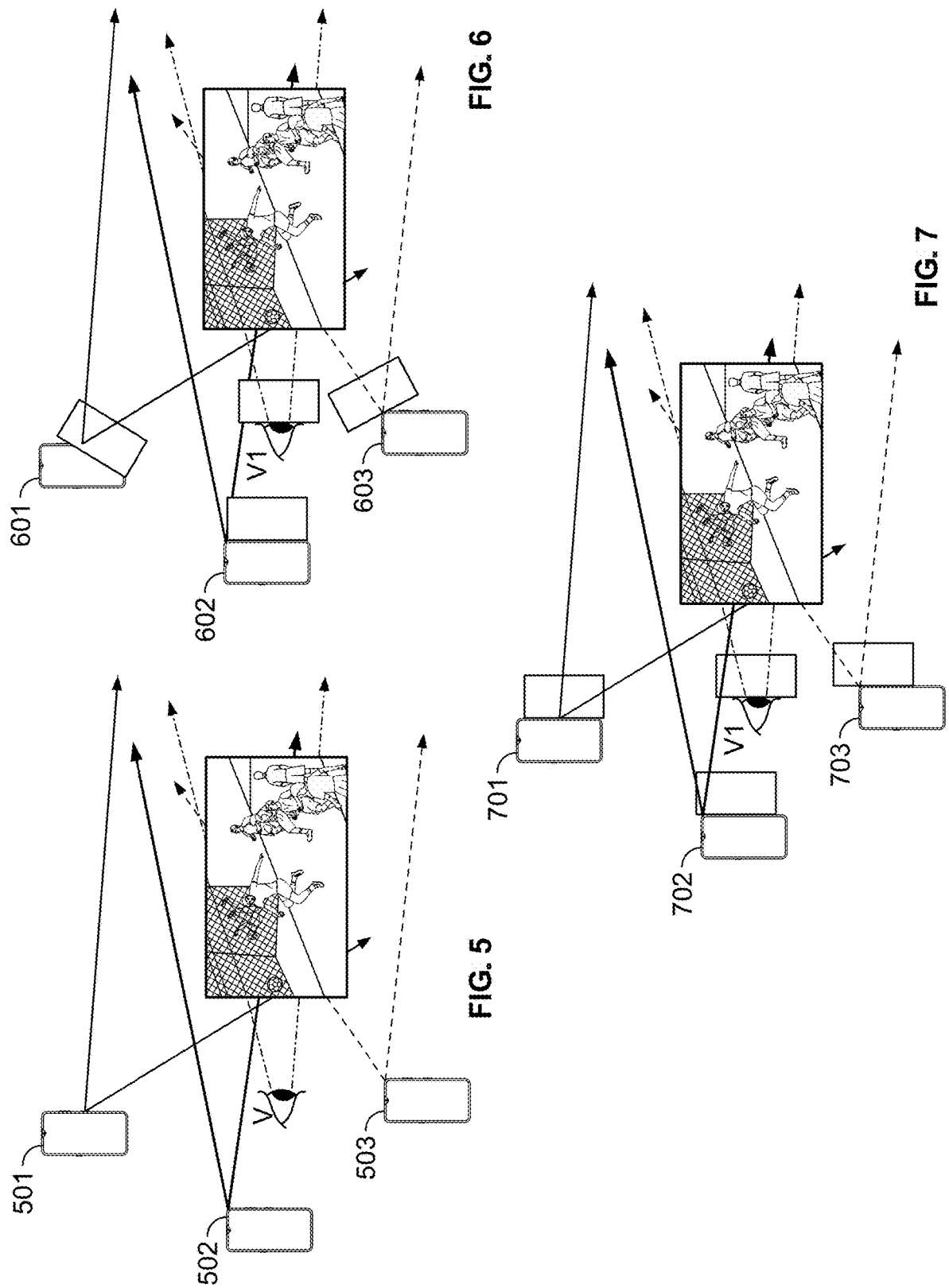

MULTI-CAMERA MULTIVIEW IMAGING WITH FAST AND ACCURATE SYNCHRONIZATION

FIELD

The present disclosure is directed to methods and systems that can generate an amalgamated recording of an event. In particular, the present disclosure includes methods and systems for synchronizing videos from multiple devices based on localization data obtained from a communication transceiver.

BACKGROUND

The field of view in a single multi-view lightfield camera is limited by the size and properties of the main lens. Thus, in many events a collection of multiple cameras are placed at known locations and coupled with advanced computers to process the large amount of data produced by the cameras.

In existing systems, the multiple cameras are synchronized. A variety of methods have been created to accomplish this task. For example, audio and video content have been jointly used for multi-camera synchronization. Image feature based synchronization and epipolar lines have also been considered. Another method is known as SocialSync, in which first the capture timestamp is estimated based on timestamps of previously delivered frames. Furthermore, the timestamp is improved by attempting several preview sequences until alignment is obtained. Managing a network of cameras is another issue that needs to be considered. The localization of a camera in a network has garnered considerable attention. For example, dense scene matching to improve the 6 degrees of freedom camera pose estimates is known in the art. Even though streaming platforms supporting real-time synchronization of multiple cameras exist, they are encumbered by their reliance on computer vision based localization. Geo-tags have been used to improve 3D models created from crowd sourced image datasets. Strategies for scheduling collection of sensor data have also been used. The present invention determines camera orientation and position without computer vision based techniques, creates real-time interactive 3D visualization without 3D model creation, and builds a collection of individuals acquiring images and videos of events in a gamification environment.

Although there is considerable work in using a collection of cameras to create multiview images and videos, existing work seems to focus on reconstruction shapes from several viewpoints, tracking humans from one camera to another, or managing a collection of cameras. In contrast, we propose a new system to determine the location of cameras relative to each other and to do so very quickly, without relying on computer vision, or image matching techniques. Several of the technologies that are needed to enable the new method for camera localization and synchronization have been shown to be feasible. For example, sub-nanosecond time of flight is possible on commercial WiFi cards; precise positioning using LiFi has been demonstrated for industrial applications; and direction of emission of a WiFi signal has been utilized for several applications. It has been noted that that signal processing can be used to discriminate LoS/NLOS components of wireless signals, and by applying Angle-of-arrival/Departure (AoA/AoD) methods to only the LoS component, a precise orientation can be obtained.

SUMMARY

According to an aspect, there is provided a method comprising: providing a user interface displayed on a user device, receiving one or more recordings of an event from the user device, determining, using a wireless communication transceiver, the geographical location of one or more user devices, determining the orientation of the user device, storing the recordings of the event from the user device, creating a representation of the event from a body of collected content wherein the body of collected content comprises at least the stored recordings of the event from multiple devices, analyzing the representation to determine the contribution to the representation from the stored recordings of the event from the devices, incentivizing, via the user interface, contribution to the representation from the user device.

In this manner, users are encouraged to contribute to a recording of an event and to obtain the most desirable views of that event. Such encouragement ensures a variety of angles of the event and that the most useful content is included.

For example, in the context of a soccer match, various views exist of different plays of the game, for example, a goal. Through the present system, audience members are more likely to record the event and share that recording. Even further, they are motivated to record the most desirable angles of the event and share those angles. As a result, a recording drawing from audience collected content, is able to provide many desirable angles to its viewers.

Additionally, in some embodiments, the method further comprises determining, based on the body of collected content, an insufficiently recorded view of the event and incentivizing the user via the user interface to record the event from that view.

In some embodiments, the method further comprises determining based on either the geographical location of the user device or the stored recordings of the event from the user device, a view of the user device, and providing a score representing the value of that view to the representation of the event.

In some embodiments, the described incentivizing is comprised of a score displayed on the user interface, where the score indicates the contribution of the stored recordings of the event from the user device compared to other sources of content. In some embodiments, the method further comprises integrating the representation of the event into a live broadcast.

In some embodiments, the method further comprises instructing a user via the user interface to create an adjusted recording of the event. In some embodiments the incentivizing further comprises incentivizing contribution in the form of a specific view of the event In some embodiments, the user device is a smartphone.

According to another aspect, there is provided a computer program that, when executed by control circuitry, causes the control circuitry to perform any of the methods discussed above. For example, there may be provided a non-transitory computer-readable medium, in which is stored computer-readable instructions including: instructions to provide a user interface displayed on a user device, instructions to receive one or more recordings of an event from one or more user devices, instructions to determine using a wireless communication transceiver, the geographical location of the user device, instructions to determine the orientation of the user device, instructions to store the recordings of the event from the user device, instructions to create a representation of the event from a body of collected content wherein the body of collected content comprises at least the stored recordings of the event from multiple devices, instructions to analyze the representation to determine the contribution to the representation from the stored recordings of the event from the devices, instructions to incentivize, via the user interface, contribution to the representation from the user device.

According to another aspect, there is provided an apparatus configured to perform any of the methods set out in the above aspect. An example of such an apparatus comprises control circuitry, or other means, configured to: provide a user interface displayed on a user device, receive one or more recordings of an event from the user device, determine using a wireless communication transceiver, the geographical location of the user device, determine the orientation of the user device, store the recordings of the event from the user device, create a representation of the event from a body of collected content wherein the body of collected content comprises at least the stored recordings, analyze the representation to determine the contribution to the representation from the stored recordings, incentivize, via the user interface, contribution to the representation from the user device.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIGS. 3A, 3B, and 3C depict configurations of devices in communication with communication transceivers;

FIG. 5 depicts an example scenario for estimating an image or video based on those captured by nearby devices;

FIG. 6 depicts the imaging planes of the devices shown in FIG. 5;

FIG. 7 depicts transformations of the imaging planes shown in FIG. 6;

DETAILED DESCRIPTION

Methods and systems according to the present disclosure allow content of an event generated by a first device to be combined with content of the event generated by a second device to create a recording of the event that encompasses multiple views. In the exemplary embodiments set out below, video captured by a first device is augmented using video captured by a second user device or multiple additional devices. In other embodiments, such methods and systems may be used to augment content other than captured video, such as audio, visual, multimedia, or other content generated or captured by the first user device. Further additional embodiments may be used with content captured by a wide range of devices and systems.

Figure 1:
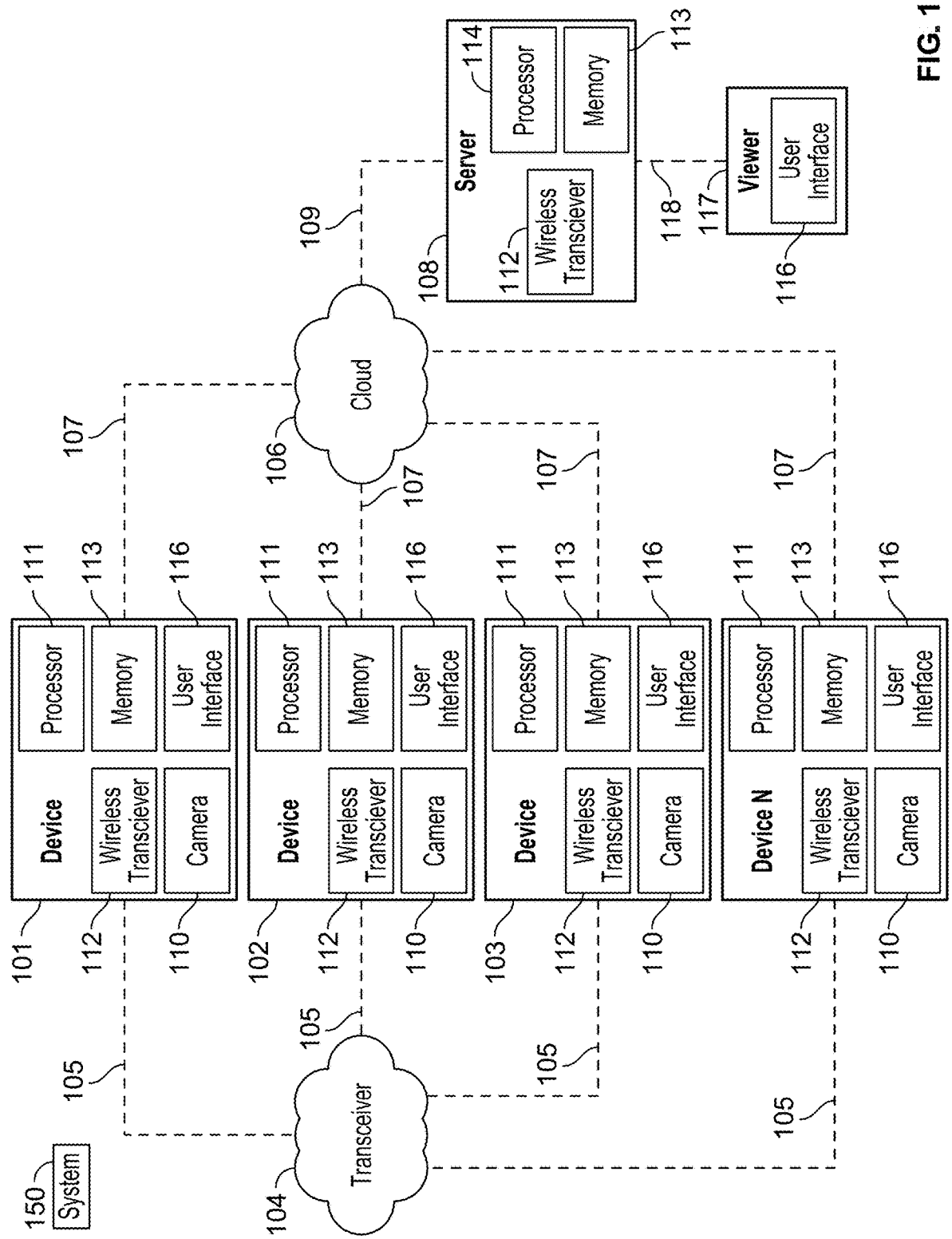
FIG. 1 depicts an example overview of the system.

FIG. 1 shows an overview of the system described herein. The system comprises devices 101, 102, 103 through N. Each device is capable of recording content via camera 110, or other content capturing mechanism such as a microphone. Each device 101 also has a processor 111, a wireless transceiver 112, a memory 113, and a user interface 116. Devices 101 may be cameras, smart phones, static cameras, mobile cameras mounted on drones, AR glasses, or any other device that can capture content. In a preferred embodiment, one or more of the devices may support lightfield imaging. In this case, the configuration of multiple cameras or smartphones can collectively create a multiview lightfield-imaging environment. More specifically, while the multiple cameras allow large movements in view like looking at a person from front and behind, lightfield support in individual cameras allow finer movements of individual objects or create small view changes that are suitable for 3D TV displays or generating stereo displays. The devices are connected to wireless communication transceiver 104 via communication link 105. Data sent and received by wireless communication transceiver 104 enables system 150 to locate devices 101 through N in space which ultimately allows content from the different devices to be pieced together quickly. The devices are also connected to the cloud 106 via a second communication link 107. Communication link 104 and 107 may be the same. For example, both may be a Wi-Fi connection. Communication links may further be WiFi Direct, Peer-to-Peer, or other means, or combination of means, for connecting devices. System 150 further includes Cloud 106, a network connecting the mobile devices 101 through N to the server 108. Server 108 may be, for example, servers associated with an application that the mobile devices use to upload the content. The cloud 106 is further connected to server 108 via communication link 109. The server 108 comprises a wireless transceiver 112, a processor 114, and a memory 115. The server 108 is in communication with viewer 117 via an additional communication link 118.

Figure 2:
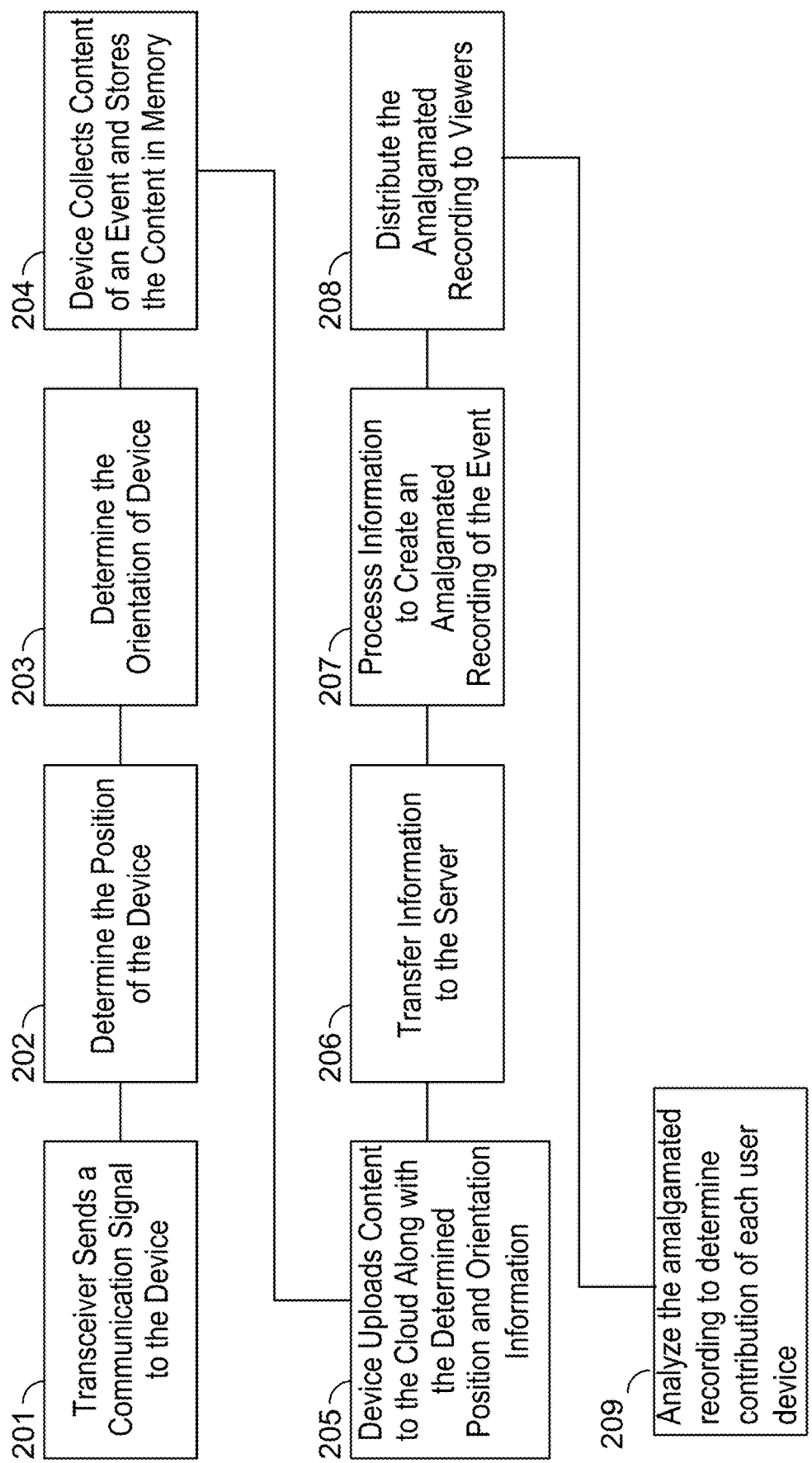
FIG. 2 depicts a flow chart of an exemplary method of the system shown in FIG. 1.

FIG. 2 depicts a flow chart of an exemplary method of they system 150. In a preferred embodiment, a device connects with a transceiver 104. The transceiver 104 sends a communication signal to the device 101 at step 201 through which it determines the position of the device 101 at processor 114 at step 202. They system 150 next determines the orientation of device 101 through inertial sensors or other means at step 203. The device 101 next collects content of an event via camera 110 and stores the content in memory 113 at step 204. The device then uploads the content to the cloud 106 via communication link 107 along with the determined position and orientation information at 205. At step 206, this information is transferred or downloaded from the Cloud 106 to the server 108 which receives the information along with that of at least a second device 102. The content collected from the various devices makes up a collection of recordings from which the server creates a final recording, the amalgamated recording, which is an amalgamation of the collected content. At 207, the processor 114 of the server 108 processes the information, that is the collection of recordings, orientations, and locations of the devices, to create an amalgamated recording. The server 108 and cloud 106 may be part of a third party service. For example, in some embodiments, a third party may be responsible for collecting the content and creating the amalgamated recording. A television provider may be a customer of the third party in another embodiment. In one embodiment, the television provider allows its video player to communicate with the third party content server via an API to retrieve content and play the content in its video players. The amalgamated recording comprises at least segments of recordings from the device 101 and at least a second device 102. Here, the segments may be clips of the recordings, aspects of the recordings, that is information derived from the recordings such as position or alternative views of an object, or images from the recordings. The processor 114 then distributes the created amalgamated recording to viewers 117 for consumption at step 208. In other embodiments, the amalgamated recording may be distributed to viewers 117 by another means, such as, for example, fetched via API calls by a service (such as a playback service) associated with the viewer device 117 and/or an application installed on viewer device 117. Finally, at step 209 the system 150 analyzes the amalgamated recording to determine contribution of the device 101.

As outlined above, the described invention combines content, preferably video, of an event where the content is captured by multiple devices, device 101 through device N. The content from the multiple devices, device 101 through device N, is combined to create an amalgamated recording of the event that combines aspects of the individual recordings from the multiple devices to generate a recording with multiple views of the event. The described system relies on localization of the contributing devices to synchronize the multiple views. This localization is based on the devices' communications with a communication transceiver 104 such as a cellular wireless base station, a WiFi or LiFi access point, or similar. Transceivers may be static or mobile. Mathematical optimization techniques can be used to obtain the best possible estimates of device locations from an over-determined system of equations. In one embodiment of the proposed system, initial estimates of localizations of devices 101 are obtained from built-in GPS and inertial sensors, which are now widely deployed in mobile devices including smartphones. In another one of the preferred embodiments, some of the devices 101 are on Wifi while others are on cellular networks. In this configuration the devices 101 that do not have WiFi will acquire position information by first using GPS data and then refining estimates using computer vision based matching. Furthermore, orientation information can be acquired using the background matching approach discussed below. The devices 101 having only cellular communication may still access the data relating to the location and popularity scores of other cameras, as well as the user interface to help guide them to better locations for capturing images or videos in real time.

Location estimates of the devices 101 derived from transceiver communication 105 can be improved by creating virtual views for static backgrounds, for example, where the virtual views are preferred views synthetically generated using available views of the event and simulating small camera rotations. Then, matches between actual and virtual views can be used to refine localization estimates for devices 101 in a network. Location estimates may also be improved by comparing backgrounds of neighboring devices 101 to infer additional information.

FIG. 3A shows a configuration of devices, capturing content in communication with a communication transceiver 104. The configuration allows positions and orientations (for example, distance and direction) of the devices to be determined relative to a central location. Here, a central transceiver 301, a communication transceiver 104, sends directional wireless data 302 to various devices 310, 311, 312, 314, and 315, to determine the position and orientation of each of these devices relative to the transceiver 301. Following this step, the relative positions and orientations of all the devices relative to one another can be determined. Such fixed points, with known "absolute position" can be used to calculate the positions of the devices. Furthermore, multiple such fixed points can be used to improve the localization of devices, known as triangulation, which is well documented in the art.

FIG. 3B shows a configuration that allows positions and orientations to be determined by a collection of decentralized devices, 310, 311, 312, 313, and 314, where some devices may be static and other mobile. Here, one smart phone, for example 310, may determine its position and orientation relative to nearby devices, for example 311 and 314, and this information is circulated for a collection.

Referring now to FIG. 3C, a more general form of interaction among a collection of devices such as cameras 316, smart phones 317, drones 318, and centralized transceivers 319 is shown. In this configuration, all devices may communicate with one another. In all instances, the devices discussed above may be static or may be in constant motion. For this reason, the location of the device 101 may be continually determined, determined for each image recorded, or for a specific period of time. The multiview image or video data is uploaded to the cloud 106 via communication link 105, along with the position and orientation information, where it will be processed by the processor 114 of the server 108 to create the amalgamated recording. The server 108 then distributes the amalgamated recording to viewers 117 via communication link 118.

Figure 4:
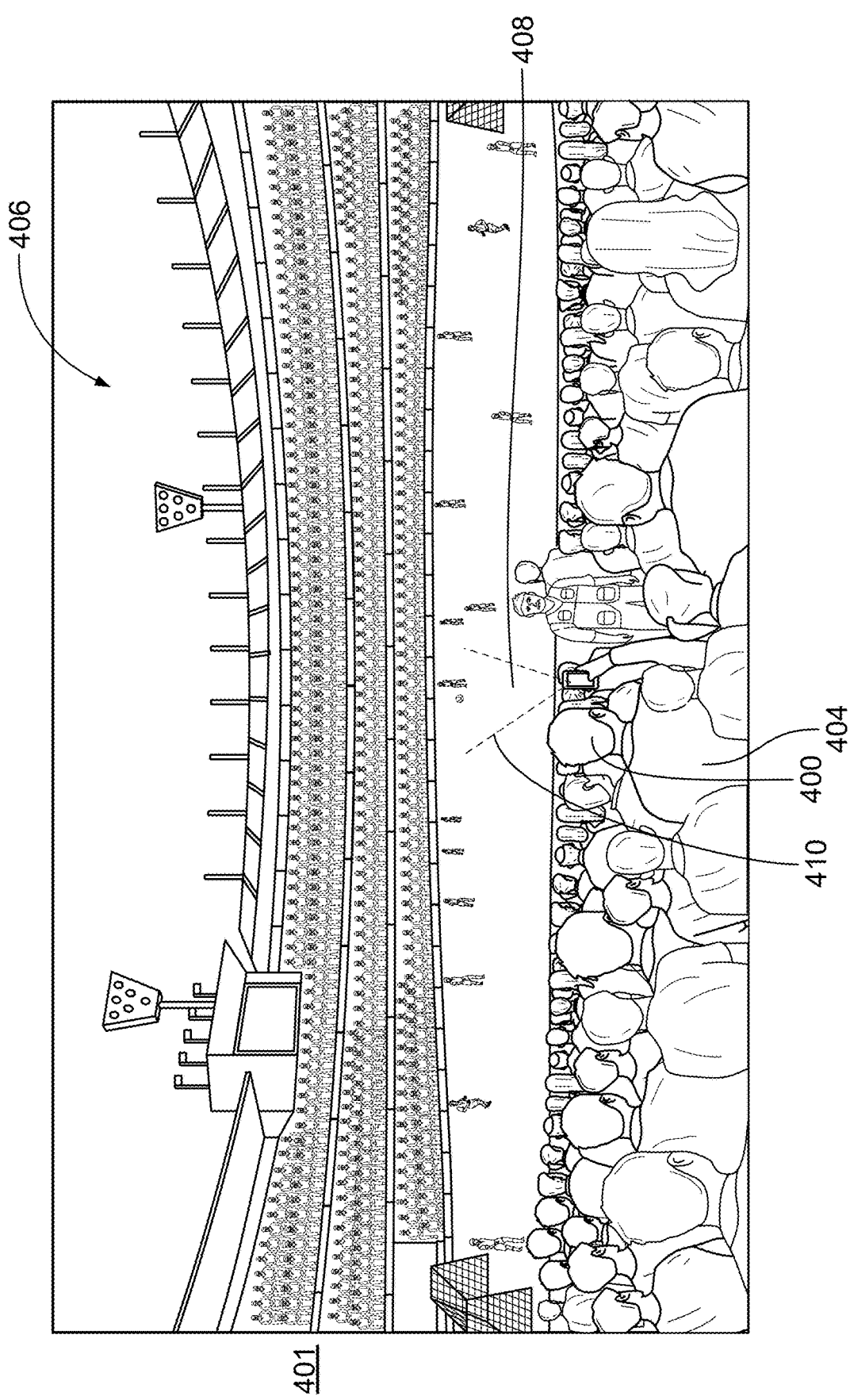
FIG. 4 depicts example scenarios of content capturing of the present invention.

FIG. 4 depicts a scenario in which a first user 400 generates content by capturing video using a first user device 101. In this particular example, the first user device 101 is a smartphone, and the first user 400 is making a video recording 408 of an event 401, here a soccer match, from their location 404 within a sports stadium 406. The recording 408 covers a field of view 410 during a particular time interval. For example, the recording 408 may capture action in the match and/or images of other attendees in the stadium 406, such as friends and family members of the first user 400.

Other attendees and devices 101, such other smartphones, television broadcast equipment, or camera operated by the game officials, are likely to also capture recordings of the event 401 in sports stadium 406. As each device 101 presents a different view or perspective of event 401, and is limited by that view and the frame of the camera of the device 101, it may be advantageous at times to combine recordings from the various devices, device 101 through device N, into an amalgamated recording that can display a wider or additional view of the event. For example, in capturing a soccer match, device 101 might have a view of a player kicking the ball, while a second device 102 might have a view of the trajectory of the ball. Both of these perspectives are interesting to viewers 117 and therefore valuable contributions to a representation, i.e., recording, of the event 401. The amalgamated recording has the ability to include both perspectives because it includes content from devices capturing both of these perspectives. The system 150 further has the ability to create multiple amalgamated recordings. The system 150 may also in some embodiments process overlapping perspectives, typically from multiple devices, device 101 through device N, to create a new, synthetic viewpoint from a desired viewing plane. In the present system, a synthetic image or video may be created where there is sufficient coverage of an event. A 360 degree video, or surround video, of objects is not necessary to generate the synthetic image or video. The system 150 allows the user to choose from multiple amalgamated recordings, each of which is derived from one or more user device recordings. In some embodiments the viewing plane may be chosen by the system 150. In some embodiments, a viewer 117 may choose from multiple viewing plane options determined by the system.

In another example, a camera operated by a sportscaster operating a first device 101 may have a close up view of the field while a fan has a partial bird's eye view of the field from the stands. The amalgamated recording of both devices, plus potentially additional devices, has the ability to include both of these perspectives of the event as well. In some embodiments the amalgamated video includes the option for viewers 117 to view different perspectives of the event 401, and interactively move between those perspectives. In a preferred embodiment, the system 150 can associate the amalgamated recording with a live broadcast recorded on a television camera. The amalgamated recording may be integrated with or accessible to the live broadcast, where integration comprises combining the amalgamated recording with the broadcast to create a representation of the event that includes aspects of both the live broadcast and the amalgamated recording, or offering the amalgamated recording as supplement content to the live broadcast. The amalgamated recording in some embodiments may be synced with the broadcast in real time or near real time. In another embodiment it may also be offered as a subscription (e.g., users subscribe to receive videos associated with specific teams, camera angles, player, etc.) with the broadcast and served as a feed (e.g., separate feed from the broadcast) of additional content.

The system 150 creates the amalgamated recording by receiving content, orientation, and position data from the devices 101. Position data allows the system to process varying perspectives without cumbersome artificial intelligence processing, although in some embodiments, computer vision based feature matching is used to improve the accuracy of the estimates of orientations of one or more devices 101. In another embodiment, estimates of distances to 3D objects can be obtained by a number of means, including depth from focus, the use of built-in ToF, Lidar in SmartPhones, or RGB-D options in cameras/smartphones. These depth estimates allow approximating the pixel properties regions of different camera images that can be used to interpolate a region of a viewing plane.

Referring now to FIG. 5, a system and method to estimate an image or video from those captured by nearby cameras is shown. Here, devices 501, 502, and 503 have a view of a goal in a soccer match. However, none of the devices provide a head on view, device 501 has a view above and behind the goal, device 502 sees behind the goal, and device 503 has a view of the goalie in front of the goal but not of the goal itself. An image or a video frame for a head on view V needs to be estimated. Such a view can be created from content captured by devices 501, 502 and 503. Note that system 150 does not need to create 360 degree video, or surround video of objects. All that is needed is sufficient coverage of important activities in a scene.

Referring now to FIG. 6, the boxes 601, 602, and 603 in this figure show the orientations of the imaging planes for devices 501, 502, and 503 respectively, and the viewing plane V1 for view V. While these planes are shown as rectangles in 2D in this diagram, in reality these would be 2D rectangles representing the viewing plane in a 3D environment.

Referring now to FIG. 7, the imaging planes in FIG. 6 are transformed to 701, 702, and 703 respectively via processor 114 to make all image planes parallel to the view plane V1 for view V. The transformed image planes, like the original image planes, are 2D rectangles.

Figure 8:
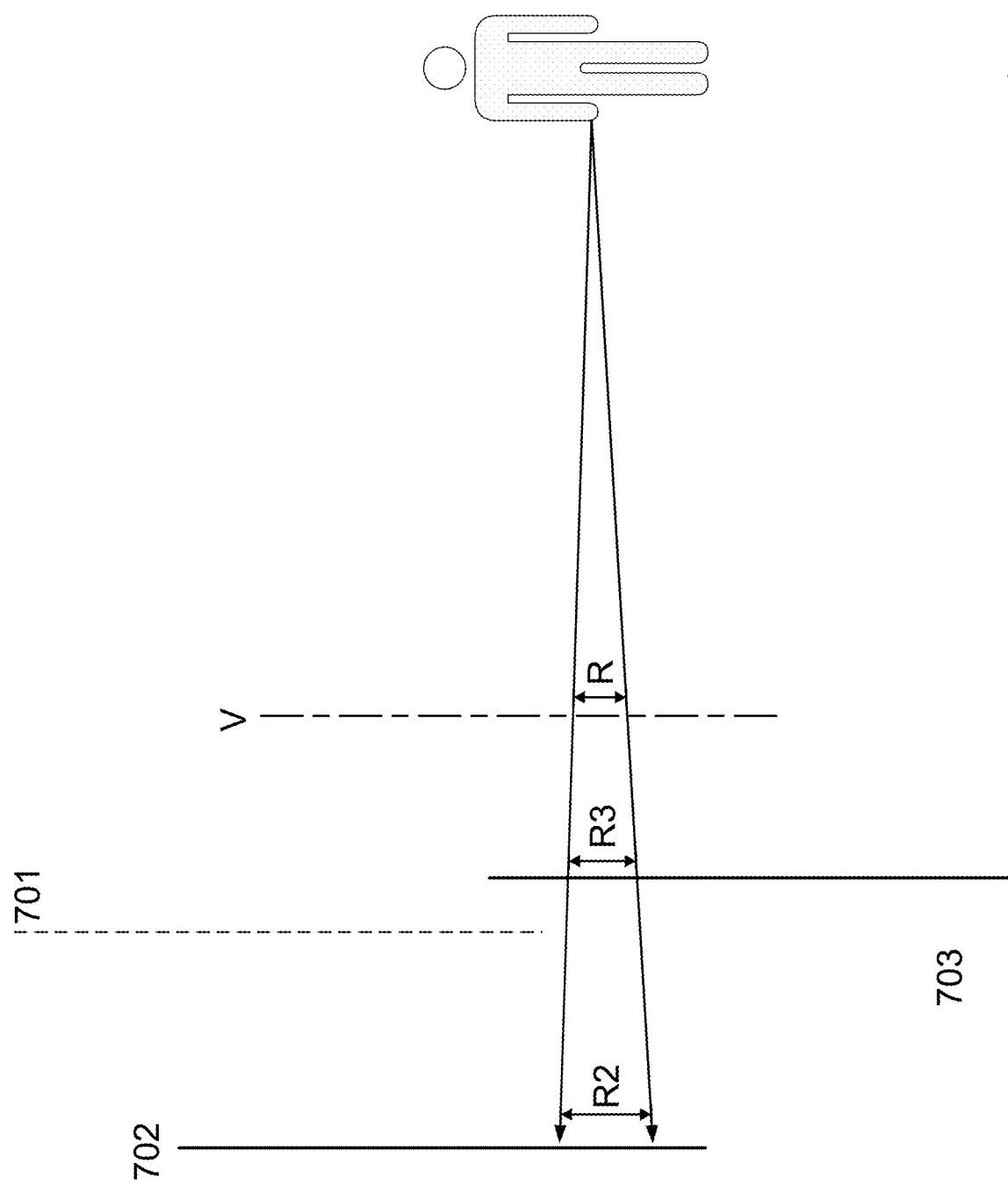
FIG. 8 depicts an illustrated method to compute the pixel values in a region of a viewing plane.

Referring now to FIG. 8, an illustrated method to compute the pixel values in a region R of the viewing plane V1 is shown. In this example, the region R represents a portion of view V on the viewing plane V1. A portion of a view may be a subset of the view, represented by a two dimensional shape, smaller than or equal to the two dimensional shape which makes up viewing plane V1. This portion can be interpolated from the regions R2 and R3, that were captured by device 502 and 503 respectively, and that capture objects and views within view V. Extrapolating data about objects and views in R2 and R3 allows the system to generate a view R. Repeating this process for other portions of view V, and combining those segments, allows the system to generate a synthetic view V.

With the collected content and location information, and any supplemental data, the system 150 creates an amalgamated recording featuring multiple perspectives captured by multiple devices 101. Devices 101 capturing content can submit their videos to an online platform to create spatial video. The system 150 is able to interpolate views and create spatial video. As discussed above, a requested perspective (such as in a VR HMD) may be generated provided sufficient number of views have been captured that may be interpolated to the requested view.

In a preferred embodiment, the locations, orientations, and relative contributions of all the devices 101 that are currently active are updated in real time and made available to all other devices 101 connected to the system 150. This enables real time gamification of multi-camera content capture. In this mode of operation, users with devices 101 can move positions in the environment and, by viewing relative contributions, maximize the popularity of their views. It also allows additional information from a centralized server 108 to reduce overlap between views and cover important regions that are currently not covered by any of the devices 101. In some embodiments, redundant position and orientation data may be generated as a result of the device interactions for a collection of devices collectively capturing a scene with multiview. The system 150 however may use this redundant information in obtaining better localization accuracy for all the devices 101. In a preferred embodiment, directional signals 105 are adapted based on the current positions of moving devices 101. This allows higher efficiency and accuracy in determining the positions and orientation, and thereby higher quality experience for viewers 117. Given the knowledge of current positions of devices 101, the directional wireless signals 105 can be concentrated primarily around the regions of these devices 101 and not uniformly in 3D space to allow much finer angular direction estimation and 3D localization.

Figure 9:
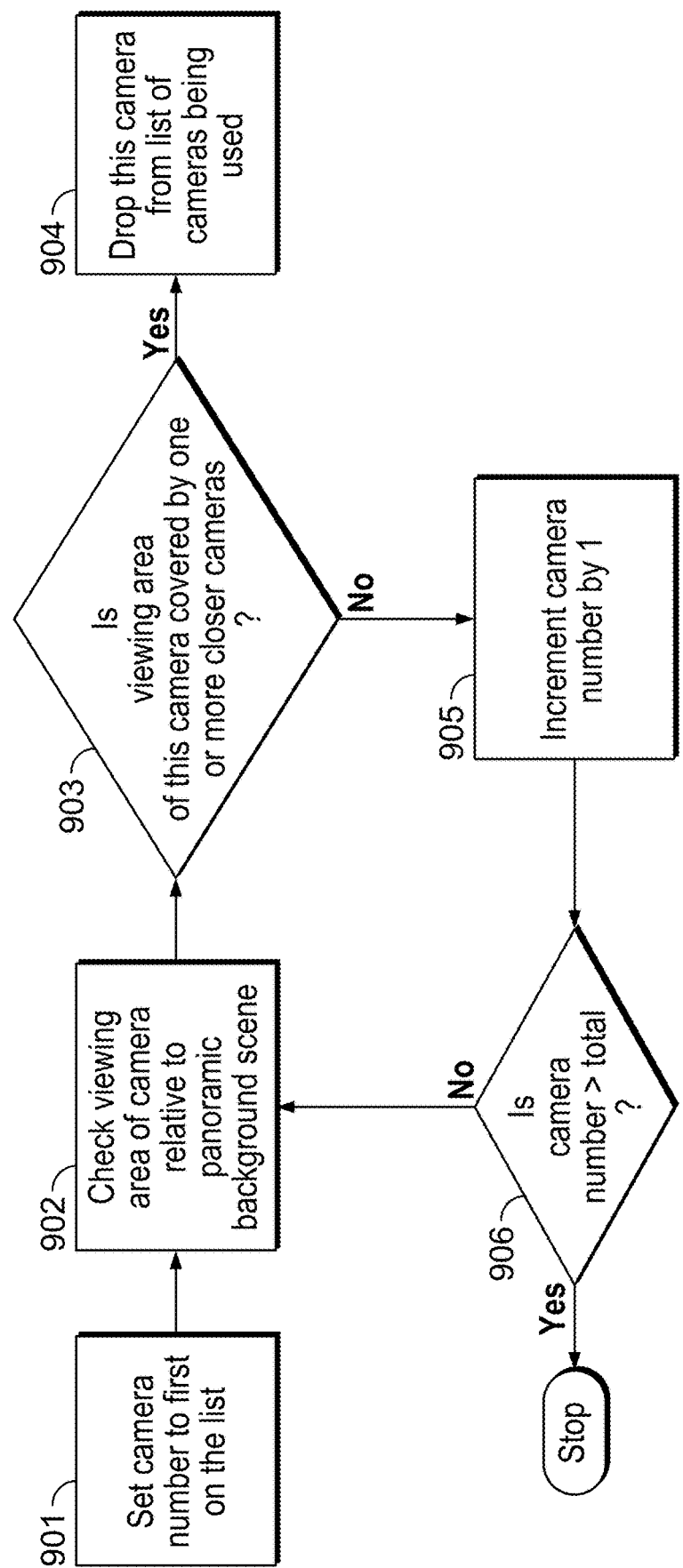
FIG. 9 depicts a method for determining and eliminating redundant devices.

In some embodiments, the system 150 processes the collected recordings and, using the background images, removes redundant and irrelevant recordings as negligible material. FIG. 9 provides a method for determining and eliminating redundant devices. Each device 101 in consideration is numbered on a list of devices. At step 901 a device is chosen and its number is designated first on the list. At step 902 system 150 checks the viewing area of the device relative to a panoramic background scene, which is a preferred background representing the region the system 150 will cover. If the viewing area matches the panoramic background scene, the method moves to step 903. If it does not match, the device is dropped from consideration. At step 903 the system 150 determines if the viewing area of the device is covered by one or more closer devices. If it is, the method moves to step 904, where the device is dropped from the list of devices considered. If it is not, the method moves to step 905. At step 905 the device remains on the list for consideration and the first device number is renumbered by one. Finally the method moves to step 906 which determines if any additional devices remain for consideration by determining if the first device number is higher than the number of devices. If it is, the method ends. If it is not the method returns to step 902. In some embodiments, when a device 101 produces negligible or suboptimal content, all content from the device 101 is removed from consideration into the amalgamated recording. This approach reduces the overall complexity of the multi-view capture environment while maintaining the same quality. Furthermore, devices 101 that contribute irrelevant content can be suspended from contributing content for a time period. As a pre-processing step at processor 114 relevant frames may be added to a queue, while frames that are irrelevant to the event could be discarded. Furthermore, uploads from devices 101 that are past a given distance from a point of interest can be limited as well. For example, viewers 117 might not be interested in frames from the south end of the field in a soccer match if the ball is in the north end. This strategy will enable faster processing of relevant spatial video at processor 114.

Figure 10:
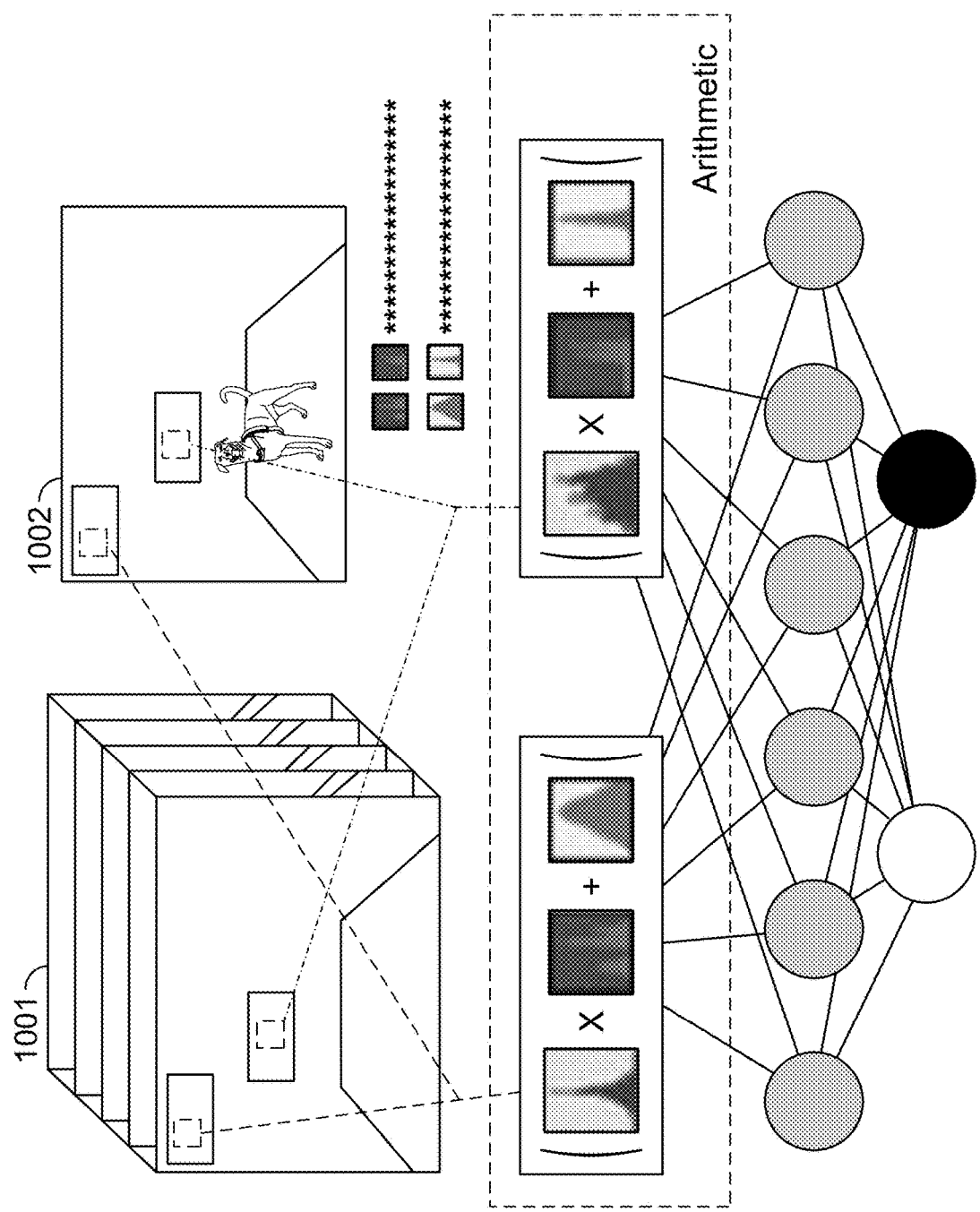
FIG. 10 depicts an architecture that can be used to improve the localization of devices in a multiview capture network.

Referring now to FIG. 10, an architecture that can be used to improve the localization of multiple devices 101 in a multiview capture network is shown. On the left side is presented a collection of images 1001 from devices with known locations. On the right is an image 1002 from a device 101 with an unknown location. The background of image 1002 is similar to those of 1001. The location of a device 101 with a similar background to that of the images 801 from known devices can be improved by comparing the backgrounds of all images. The similar backgrounds indicate that the device 101 that created the image 802 is in close proximity to the device or devices which captured the images 1001. By analyzing shared objects, 1010 and 1020, using a neural network and distribution learning, the system 150 can infer further information about the device 101 that created the image 1002. Even though the localization and synchronization of cameras can be achieved purely by directional wireless signals and time of flight (ToF) sensing, these estimates can be further improved by detecting the static background in a video and matching the background in the scene after compensating for rotational movements of a camera, such as pan, tilt, zoom, and translation. Given the background images from two nearby cameras, the best match will be obtained when the correct relative positions and orientations between the devices 101 are known. Assuming that the estimates based purely wireless signals and ToF may have slight inaccuracies, images with small rotations can be synthetically generated from an existing image. These synthetic images can then be matched with actual images to determine the best match and thereby the best estimates of positions and orientations of cameras.

In some embodiments, the system may also use inter-device feature communication for more accurate localization, faster and precise video synchronization among cameras. In another embodiment, the system may use Active Calibration and extend distribution learning to a network of cameras to determine foreground and background using distribution learning to robustly calibrate for camera parameters in real-time. The rotational parameters that are needed for active calibration are obtained directly from the WiFi/LiFi based fast camera localization. This avoids the need for complex calibration algorithms and the need for having some known shapes or patterns for calibration.

Figure 11:
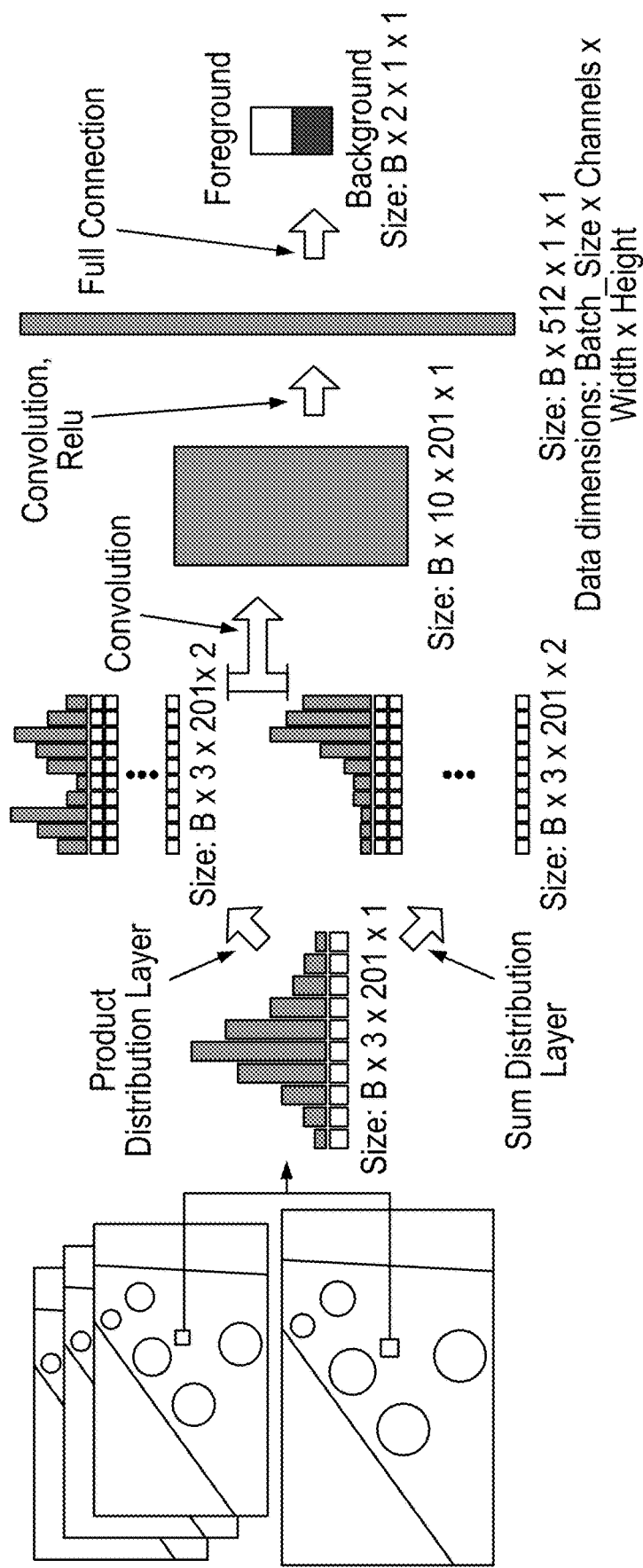
FIG. 11 depicts an architecture for extending distribution learning using moment distribution.

Referring now to FIG. 11, an architecture for extending distribution learning using moment distribution is discussed. Here, in addition to arithmetic distribution layers of addition and multiplication, moments of various orders are considered. These moments can be added as new layers in a neural network. Given any arbitrary function, it can be expanded using a Taylor series and approximated by dropping higher order terms. Thus, even arbitrary functions can be approximated by moments of lower orders.

In further embodiments, changes in camera parameters like focal length modifications over time resulting from zooming in or out, can be calculated in real time by keeping track of changes in camera orientation and using active calibration techniques considering features of the background scene. In one embodiment, the device 101 (e.g., smartphone camera) provides data to the server 108 on the image zoom along with position and orientation. If it is not available from the device 101, zoom may be determined by first building up the overall background of a scene based on background subtraction and image mosaicking. Following this, as cameras or other devices 101 move around, their precise orientations can be improved (over value derived from LoS/AoA method) by matching the current image or video frame captured with a part of the static background. Furthermore, the zoom factor of a device 101 can be determined by the size of the area of the background image captured. In another embodiment, the wireless transceiver 104 responsible for position and orientation determination of participating devices 101 through N, may be allowed to set parameters such as zoom, resolution, etc., in the user devices 101 through N. This reduces parameter variation across devices easing the processing required to generate amalgamated recordings.

In some embodiments, a user 400 collects the recording via a user interface 116 installed on the user device 101. The user interface 116 may provide a display for the images captured by the device 101 and provide options to record, upload, delete, edit, or add effects. It may also include a feed or images of the event 401 comprising at least a portion of the amalgamated recording or a separate feed or images. In the scenario of a live broadcast, the amalgamated recording can be made available to viewers 117 watching an event 401 via a broadcast, a breaking news event getting live coverage, or a replay of the broadcast on individual devices.

In some embodiments the user interface 116 encourages user participation. This system measures how much one camera or device 101 view is observed relative to others. The system also accounts for view interpolation, where more than one device 101 view may be used to interpolate an intermediate view. In some embodiments, the system encourages user participation in the form of revenue share of the amalgamated recording a device 101 has contributed to. In some embodiments, the contribution, and by extension the popularity, utility, or revenue share of a user, is determined by calculating the number of time intervals (minutes, seconds, etc., for example) and dividing that number by the total time intervals of the amalgamated recording to arrive at a relative contribution. When creating a synthetic view based on a viewer location and interpolated views, the relative proportion of the view from a given device that is used can be determined and added as the contribution from this given device for the given time interval. In a preferred environment, the total contribution from all the devices for a given time interval for an interpolated view will be adjusted to represent a percentage, or add up to 1 or other fixed pre-determined constant. This adjusted representation may be used in calculating contributions to the final recording.

The contributions can be accumulated over shorter or longer durations to estimate contributions over a specific period. In a preferred embodiment, the current popularity values for different devices 101 are calculated by the processor 114 of the server 108 based on tables storing usage of content by viewers 117 in real time. These values are displayed and updated in the user interface 116 in real time to all people capturing content on a device 101. In certain circumstances, or during an initial period of time, sufficient or meaningful viewer data may not be available. For these situations, historic tables built using viewing data from past events can be used. The historic tables can provide data on content capture locations and movements of capture devices with respect to a fixed location, preferred orientations and changes to zoom. In one embodiment, the system assigns scores as devices upload content. In a preferred embodiment, uploads from devices 101 with a high relevancy scores are prioritized. Devices 101 can be also prioritized based on the device capabilities or specifications. Device priority can also be based on distance to the field/goal or the location of an action, for example, the closer the device 101 is to event 401 the more likely its content will be selected.

Figure 12:
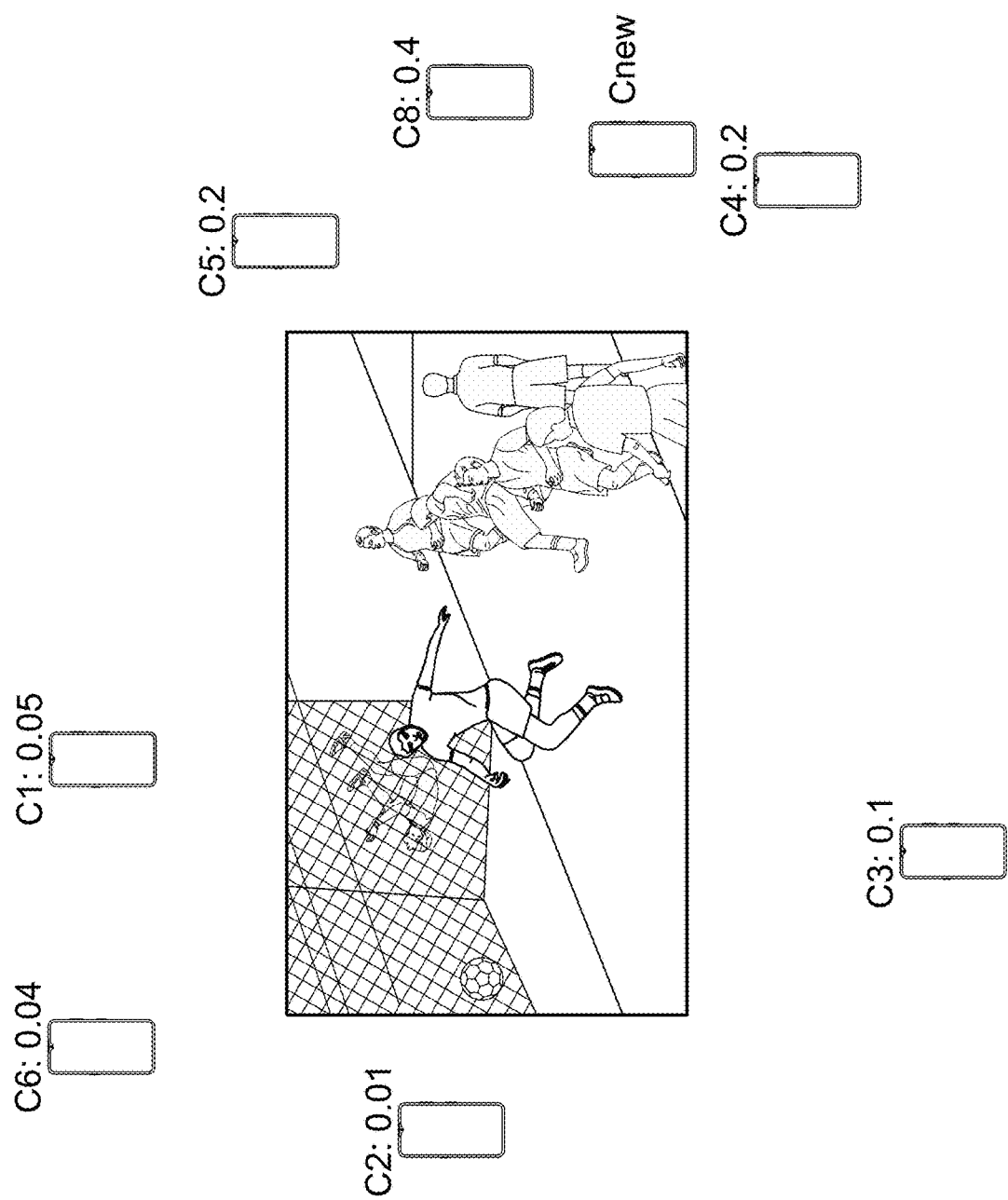
FIG. 12 depicts devices of the present system positioned at an event and displays the devices' respective popularity scores.

In some embodiments, the user interface 116 encourages users 400 to access a preferred perspective. In one embodiment, the user interface 116 displays a representation of the popularity or utility of the current perspective a user is capturing. In some embodiments, a relative popularity value is displayed to signify this representation. For example, in FIG. 12 the values shown next to C1 to C8 are scaled by the total to get a relative value that adds up to 1 for all the values. Cnew represents a new participant who is trying to find a good position. In some embodiments, the relative popularity value will change in the user interface 116 as the user changes positions and perspectives. In this figure, Cnew is looking for the highest valued view by observing the popularity values at the cameras in different perspectives. The values and locations/orientations for different device 101 can be displayed in user interface 116 using a 2D or 3D graphical user interface to assist active participants to move around more easily. The user interface 116 may further include directions to instruct users 400 to find the most optimal view. For example, the user interface 116 may send a message recommending that the user 400 move to the left or right, move the camera up or down, or zoom in or out. Even though we discuss Cnew moving, other participants like C1 to C8 may also be constantly in motion in real time using this system and method.

In preferred embodiment, a user 400 can specify the trajectory of his or her device 101 by touch and/or gesture interactions on the user interface 116. In another preferred embodiment, a user 400 may be prevented from moving or turning to a location where no view is available. In another preferred embodiment, users 400 see an error notice or missing region when they move or turn to a location where no camera view is available. In another one of the preferred embodiments, user 400 sees a virtual environment based on knowledge of surrounding regions when they move or turn to a location where no camera view is available.

The interface 116 can be modified to provide guidance to move to locations that are missing from the recorded content, need additional content, or that are more popular with viewers 117. Locations that are missing from the recorded content, need additional content, or that are more popular with viewers may first be determined by the system 150 or otherwise communicated to the system 150. The system may in some embodiments then communicate this information to the user interface 116. The user interface 116 can also be modified to provide guidance on modifying the orientation and zoom of a device 101 without moving location; a strategy that can be useful when it is difficult to move location, e.g., given a fixed seat in a stadium. In another embodiment, a user interface 116 may provide information on current relative popularity of other devices 101 and their locations/orientations.

The user interface 116 can provide still additional features on the viewing side as well (i.e., on viewer device 117). For example in a preferred embodiment, the user interface 116 may flag videos featuring a viewer's 117 favorite player or mascot. In another one of the preferred embodiments, the user interface 116 includes a progress bar and the a progress bar is updated throughout a game (e.g., by overlaying various icons on the progress bar) to include or highlight references to most viewed and most liked spatial videos. In another one of the preferred embodiments, viewers 117 may subscribe to content captured from one or more specific locations relative to the game field, for example, a viewer 117 may want to see a game from a home or visitor perspective. In another one of the preferred embodiments, supplemental content is available for objects in view and these objects are highlighted or marked to make viewers 117 aware that supplemental material is available for the marked items. Viewers 117 on their own display devices can request this supplemental content. This feature can also be useful when an action happens during an ongoing event. For example, if two players get into an altercation during a goal and receive a penalty for the altercation, a viewer 117 might want to watch the altercation to understand the reason for the penalty. In this situation, the system 150 may have additional content on the altercation, mark the players involved as having additional content, and the viewer 117 may choose to view the additional content on his or her display.

In another one of the preferred embodiments, the user interface 116 on viewer device 117 adds an "as seen by fans," "as seen by audience," or similar, icon to the amalgamated recording when viewers are watching content captured by user devices, which may be one or more of devices 101 through N. This supplemental content can be displayed alongside a main event or broadcast. In another embodiment it can be displayed in a PiP (Pictured in Picture, for example) or it can be displayed in a separate application simultaneously with the main event or broadcast. This feature is accomplished by sharing metadata of content available at sever 108 with viewer 117 and the metadata may be deep-linked to the content itself (i.e., to the video). The icon may be displayed on the user interface 116 based on the availability of content or metadata associated with the content at server 108. For example, metadata such as time of capture or location of capture of the content captured by devices 101 through N can be correlated with the time of one event in a larger event, such as a goal in a soccer match. Viewers 117 may in some embodiments subscribe to certain content or type of content. The metadata associated with such content may include additional information such as indicating that a video contains images of a player (e.g., L. Messi, T. Brady, etc.), a play or event (e.g., penalty kick), or a team with possession of the ball. The metadata may further indicate a detailed location such as where content was captured within the stadium or field (south end of the field, north end of the field, etc.). Such information can be derived based on the location of transceiver 104. The "as seen by audience" or similar feature can also be dedicated to automatic replays or replays initiated by a viewer 117 watching on his or her own display device. In some embodiments of the present invention, system 150, unlike existing systems, constructs new and different formats, such as those from new perspectives and multiple formats and automatically associates them with an action (e.g., pass interference, touch down etc.) that occurred earlier within a particular event or game by correlating the time of the event with the time a video (i.e. content) was captured. The association may also be based on the location of device 101 and the location of the event. Such association can be accomplished in real time or near real time. In embodiments where a single representation is displayed in response to a replay request, the content can be referenced in a manifest file and used in trick-play requests. This means that in those embodiments, a replay will not repeat content seen in the broadcast, but instead displays content captured by the devices 101 that is processed at server 108.

Figure 13:
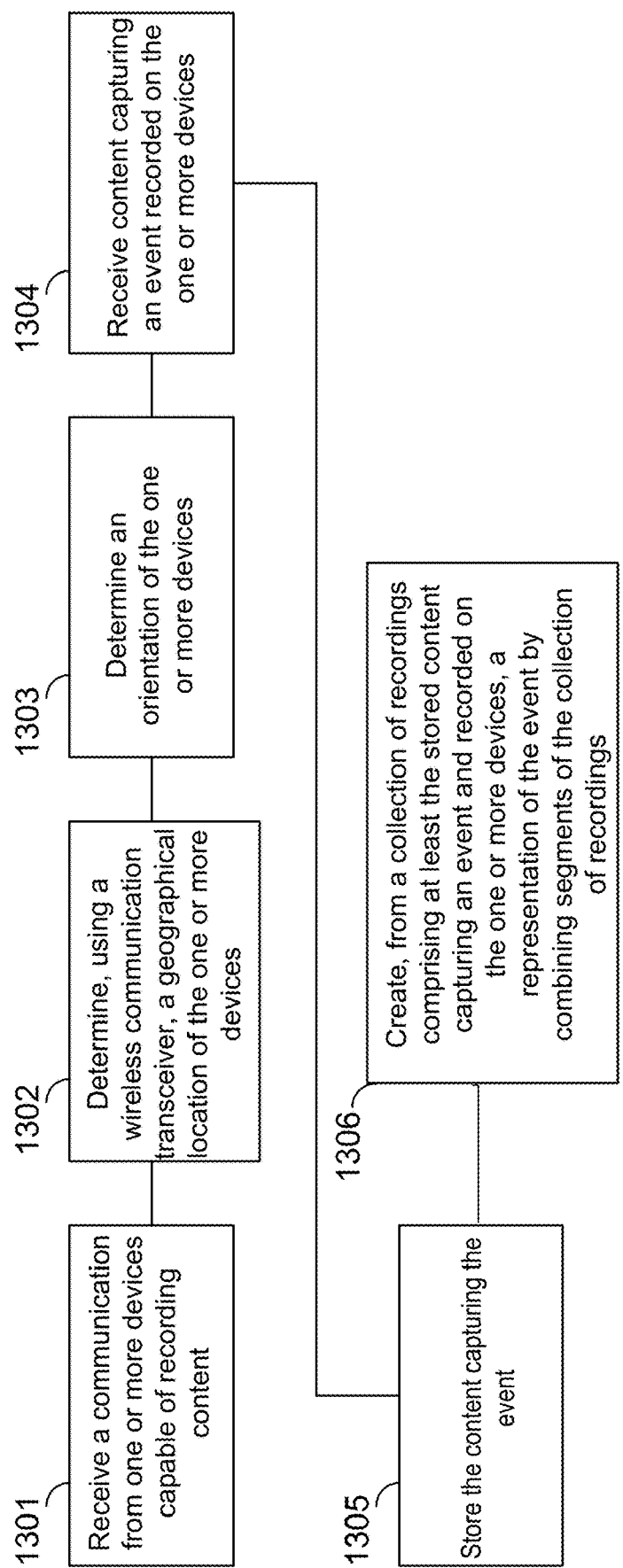
FIG. 13 depicts a second flow chart of an exemplary method of the system shown in FIG. 1.

FIG. 13 shows an additional method of one embodiment of the invention. The method comprises the system 150, at step 1301, receiving a communication from one or more devices, device 101 through device N, the devices being capable of recording content. Device 101 represents a first device and device N represents an Nth device where N is the number of total devices in the system 150. Step 1302 is determining, by system 150 and using a wireless communication transceiver 104, a geographical location of the one or more devices 101 through device N. At step 1303 the system 150 determines an orientation of the one or more devices 101 through device N. At step 1304 the system 150 receives content capturing an event 401 and recorded on the one or more devices 101 through device N and at 1305 stores the content capturing an event 401 and recorded on the one or more devices 101 through device N in a memory 113. Finally, at step 1306 the system creates, at processor 114, from a collection of recordings comprising at least the stored content capturing an event 401 and recorded on the one or more devices 101 through device N, a representation of the event 401 by combining segments of the collection of recordings.

Figure 14:
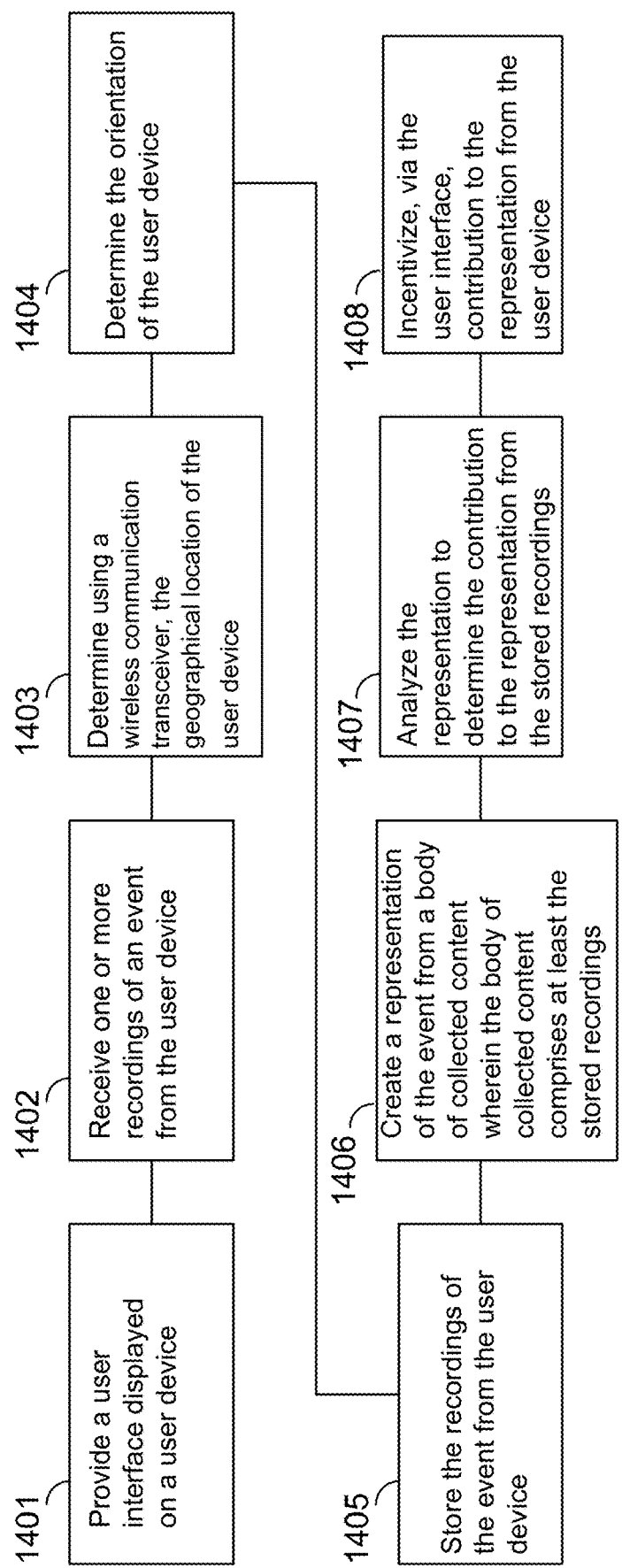
FIG. 14 depicts a third flow chart of an exemplary method of the system shown in FIG. 1.

FIG. 14 shows yet another method of another embodiment of the invention. The method comprises the system 150 providing a user interface 116 displayed on a user device 101 at step 1401. At step 1402 it receives one or more recordings of an event 401 from the user device 101 and at step 1403 determines, using a wireless communication transceiver 104, the geographical location of the user device 101. At step 1404 the system 150 determines the orientation of the user device. At step 1405 the system 150 stores the recordings of the event 401 from the user device. At step 1406 it creates a representation of the event 401 from a body of collected content wherein the body of collected content comprises at least the stored recordings of the event 401 from the user device 101. At step 1407 the system 150 analyzes the representation to determine the contribution to the representation from the stored recordings of the event 401 from the user device 101 and step 1408 incentivizes, via the user interface 116, contribution to the representation from the user device 101

In one embodiment, server 108 processes content (e.g., combines portions of different, for example, videos recorded by user device 101 through user device N) based on context. For example, the context can be a football game, a basketball game, a baseball game, etc. The context can also include additional information, for example, teams, location of the game (e.g., location of stadium), time the game starts, time the game ends, time the teams are taking a break (e.g., half-time), etc. In some embodiments all recorded content uploaded from the devices is associated with a context. For example, the content can be tagged to a game or event, and later analyzed to add additional tags (e.g., identify an action in the game—such as a touchdown, interception, penalty kick, identify a team that has possession of the ball, identify a player or players involved, etc.). The additional tags allow serving content of interest or based on user preferences. For example, viewer device 117 might subscribe to receive content from specific devices through server 108 based on predefined tags or criteria (e.g., penalty kick, touchdown, etc.). Analysis can be done by utilizing trained machine learning models to generate automatically generated additional tags.

In one embodiment, a software application on device 101 allows the selection of a context. For example, the application may be associated with a service that processes and generates amalgamated recordings and/or makes the content available to viewer device 117. The app may have different interfaces for devices 101 and viewers 117 or there may be one app with both recording and viewing features. More specifically, the application might present a user interface 116 that allows the user to confirm at least one context associated with the content that is to be captured and automatically uploads such video to server 108. In some embodiments, the application may suggest the context, such as a game, "Seahawks vs. 49ers," based on the location of the device 101 and enable the user 400 to authorize the automatic upload of the content. In one embodiment, the capture and recording process takes place from within the application (i.e., the application presents a UI that includes a record button).

In one embodiment, server 108 polices the content uploaded by devices 101 through N. For example, in one embodiment, devices 101 through N are only permitted to upload content if the device location matches the location of a live event (e.g., live football game). The location of a game is publicly available information and can be retrieved from EPG (electronic programming guide) metadata. Using the location of device 101 enables server 108 to discard content from devices not in the correct location and to avoid associating it with an event. For example, if a football game is being played at Levi's Stadium but a video was captured at a different location, then such video should not be associated with the broadcast of the game.

In another embodiment, server 108 polices content upload from devices 101 through N by discarding irrelevant frames based on the context. For example, server 108 might suspend devices that are contributing irrelevant content. Irrelevant content is any uploaded content that is not related to the context that the video is associated with. In some embodiments server 108 performs a pre-processing step to determine irrelevant content or frames and discard them (i.e., does not include them in further processing). This enables faster processing by processing only relevant content to generate an amalgamated recording. In one embodiment the system 150 might prioritize uploads from devices 101 with a high relevancy score. For example, scores may be assigned to devices 101 that previously uploaded desirable content (i.e., its previous uploads were popular). Prioritization can also be based on the device 101 capability (e.g., camera specifications) or proximity to an object of interest.

It should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:
providing a user interface displayed on a user device;
receiving one or more recordings of an event from the user device;
determining, using a wireless communication transceiver, a geographical location of the user device;
determining an orientation of the user device;
storing the recordings of the event from the user device;
creating a representation of the event from a body of collected content wherein the body of collected content comprises at least the stored recordings of the event from the user device;
analyzing the representation to determine a contribution to the representation from the stored recordings of the event from the user device;
determining a contribution score representing a utility value of the contribution of the stored recordings of the event from the user device based at least in part on the geographical location and the orientation of the user device;
causing the contribution score to be displayed on the user interface of the user device with a recommendation for a second geographic location and second orientation to improve the contribution score;
updating the contribution score representing the utility value as the user device changes to the second geographic location and the second orientation; and
causing the updated contribution score to be displayed on the user interface of the user device.

2. The method of claim 1, further comprising determining, based on the body of collected content, an insufficiently recorded view of the event and causing to be displayed on the user interface instructions to record the event from the insufficiently recorded view.

3. The method of claim 1, wherein the contribution score indicates the contribution of the stored recordings of the event from the user device to the representation compared to a one or more alternative content sources in the body of collected content.

4. The method of claim 1, further comprising integrating the representation of the event into a live broadcast.

5. The method of claim 1, wherein said user device is a smartphone.

6. The method of claim 1, further comprising;
setting, using the wireless communication transceiver, one or more camera parameters of the user device.

7. The method of claim 1 further comprising causing a recommendation for a zoom setting of the user device to be displayed on the user device.

8. A non-transitory computer-readable medium, in which is stored computer-readable instructions including:
instructions to provide a user interface displayed on a user device;
instructions to receive one or more recordings of an event from the user device;
instructions to determine using a wireless communication transceiver, a geographical location of the user device;
instructions to determine an orientation of the user device;
instructions to store the recordings of the event from the user device;
instructions to create a representation of the event from a body of collected content wherein the body of collected content comprises at least the stored recordings of the event from the user device;
instructions to analyze the representation to determine a contribution to the representation from the stored recordings of the event from the user device;
instructions to determine a contribution score representing a utility value of the contribution of the stored recordings of the event from the user device based at least in part on the geographical location and the orientation of the user device;
instructions to cause the contribution score to be displayed on the user interface of the user device with a recommendation for a second geographic location and second orientation to improve the contribution score;
instructions to update the contribution score representing the utility value as the user device changes to the second geographic location and the second orientation; and
instructions to cause the updated contribution score to be displayed on the user interface of the user device.

9. The non-transitory computer-readable medium of claim 8, further comprising instructions to determine, based on the body of collected content, an insufficiently recorded view of the event and causing to be displayed on the user interface instructions to record the event from the insufficiently recorded view.

10. The non-transitory computer-readable medium of claim 8, wherein the contribution score indicates the contribution of the stored recordings of the event from the user device to the representation compared to a one or more alternative content sources in the body of collected content.

11. The non-transitory computer-readable medium of claim 8, further comprising instructions to integrate the representation of the event into a live broadcast.

12. The non-transitory computer-readable medium of claim 8, wherein said user device is a smartphone.

13. The non-transitory computer-readable medium of claim 8, further comprising instructions to set, using the wireless communication transceiver, one or more camera parameters of the user device.

14. An apparatus comprising:
control circuitry configured to:
provide a user interface displayed on a user device;
receive one or more recordings of an event from the user device;
determine using a wireless communication transceiver, a geographical location of the user device;
determine an orientation of the user device;
store the recordings of the event from the user device;
create a representation of the event from a body of collected content wherein the body of collected content comprises at least the stored recordings;
analyze the representation to determine a contribution to the representation from the stored recordings;
determine a contribution score representing a utility value of the contribution of the stored recordings of the event from the user device based at least in part on the geographical location and the orientation of the user device;

cause the contribution score to be displayed on the user interface of the user device with a recommendation for a second geographic location and second orientation to improve the contribution score;

update the contribution score representing the utility value as the user device changes to the second geographic location and the second orientation; and cause the updated contribution score to be displayed on the user interface of the user device.

15. The apparatus of claim 14, wherein the control circuitry is further configured to determine, based on the body of collected content, an insufficiently recorded view of the event and causing to be displayed on the user interface instructions to record the event from the insufficiently recorded view.

16. The apparatus of claim 14, wherein the contribution score indicates the contribution of the stored recordings of the event from the user device to the representation compared to a one or more alternative content sources in the body of collected content.

17. The apparatus of claim 14, wherein the control circuitry is further configured to integrate the representation of the event into a live broadcast.

18. The apparatus of claim 14, wherein the control circuitry is further configured to set, using the wireless communication transceiver, one or more camera parameters of the user interface of the user device.

* * * * *